(12) United States Patent
Diefenbaugh et al.

(10) Patent No.: US 7,549,177 B2
(45) Date of Patent: Jun. 16, 2009

(54) ADVANCED THERMAL MANAGEMENT USING AN AVERAGE POWER CONTROLLER OVER AN ADJUSTABLE TIME WINDOW

(75) Inventors: Paul Diefenbaugh, Portland, OR (US); Ishmael Santos, Milpitas, CA (US)

(73) Assignee: Intel Corporation, Santa Clara, CA (US)

( * ) Notice: Subject to any disclaimer, the term of this patent is extended or adjusted under 35 U.S.C. 154(b) by 807 days.

(21) Appl. No.: 11/091,096

(22) Filed: Mar. 28, 2005

(65) Prior Publication Data

US 2006/0218423 A1    Sep. 28, 2006

(51) Int. Cl.
*G06F 1/26*    (2006.01)
(52) U.S. Cl. .................... 726/36; 713/310; 713/320; 713/340
(58) Field of Classification Search ................ 713/310, 713/340, 320; 726/36
See application file for complete search history.

(56) References Cited

U.S. PATENT DOCUMENTS

| | | | | |
|---|---|---|---|---|
| 5,442,608 A * | 8/1995 | Umeda et al. | ............ | 369/44.27 |
| 5,590,061 A | 12/1996 | Hollowell, II et al. | | |
| 5,875,096 A * | 2/1999 | Gates | .................... | 361/704 |
| 6,123,266 A * | 9/2000 | Bainbridge et al. | ........ | 236/49.3 |
| 6,167,330 A * | 12/2000 | Linderman | .................. | 700/295 |
| 6,353,894 B1 * | 3/2002 | Pione | ........................ | 713/340 |
| 6,407,921 B1 * | 6/2002 | Nakamura et al. | .......... | 361/700 |
| 6,427,444 B1 * | 8/2002 | Miyazawa | ................... | 60/508 |
| 6,463,396 B1 | 10/2002 | Nishigaki | | |
| 6,535,798 B1 * | 3/2003 | Bhatia et al. | ................ | 700/293 |
| 6,630,754 B1 * | 10/2003 | Pippin | ........................ | 307/117 |
| 6,702,457 B1 * | 3/2004 | Smith | .......................... | 374/141 |
| 6,728,102 B2 * | 4/2004 | Ishikawa et al. | ............ | 361/687 |
| 6,751,095 B2 * | 6/2004 | Ishikawa et al. | ............ | 361/687 |
| 6,889,330 B2 * | 5/2005 | Chauvel et al. | ............. | 713/300 |
| 6,901,521 B2 * | 5/2005 | Chauvel et al. | ............. | 713/300 |
| 6,908,227 B2 * | 6/2005 | Rusu et al. | ................... | 374/141 |
| 6,936,372 B1 * | 8/2005 | Jagota et al. | .................. | 429/50 |
| 6,966,693 B2 * | 11/2005 | Prakash et al. | .............. | 374/163 |
| 7,111,177 B1 * | 9/2006 | Chauvel et al. | ............. | 713/300 |
| 7,143,300 B2 * | 11/2006 | Potter et al. | ................. | 713/323 |
| 7,174,194 B2 * | 2/2007 | Chauvel et al. | ............. | 455/574 |
| 7,421,598 B2 * | 9/2008 | Brittain et al. | .............. | 713/320 |
| 7,426,649 B2 * | 9/2008 | Brittain et al. | .............. | 713/320 |
| 2002/0055961 A1 * | 5/2002 | Chauvel et al. | ............. | 708/100 |
| 2002/0066047 A1 | 5/2002 | Olarig et al. | | |
| 2002/0087904 A1 * | 7/2002 | Cai | ............................ | 713/322 |

(Continued)

OTHER PUBLICATIONS

U.S. Appl. No. 11/165,603, filed Jun. 23, 2005, Diefenbaugh.

(Continued)

*Primary Examiner*—David García Cervetti
(74) *Attorney, Agent, or Firm*—Blakely, Sokoloff, Taylor & Zafman LLP

(57) ABSTRACT

Systems and methods of conducting thermal management provide for transmitting average power data to a source device, where the source device has a thermal influence on a target device and the average power data is based on the thermal influence. Adjustable time window data may also be transmitted to the source device, where the time window defines the amount of time for determining and controlling the average power consumption of the source device.

14 Claims, 5 Drawing Sheets

U.S. PATENT DOCUMENTS

| | | | |
|---|---|---|---|
| 2003/0072134 A1* | 4/2003 | Ishikawa et al. | 361/687 |
| 2003/0125900 A1* | 7/2003 | Orenstien et al. | 702/132 |
| 2003/0188210 A1 | 10/2003 | Nakazato | |
| 2004/0047099 A1* | 3/2004 | Pippin | 361/103 |
| 2004/0057207 A1* | 3/2004 | Ishikawa et al. | 361/687 |
| 2004/0085734 A1* | 5/2004 | Ishikawa et al. | 361/704 |
| 2004/0136437 A1* | 7/2004 | Prakash et al. | 374/163 |
| 2006/0179334 A1* | 8/2006 | Brittain et al. | 713/320 |

OTHER PUBLICATIONS

PCT Search Report; PCT/US2006/011011, Mailing date Aug. 2, 2006. Intel Corporation.

DE PTO, "42P21221DE OA Mailed Jul. 23, 2008 for German Patent Application 11 2006 000 569.3-53", (Jul. 23, 2008), Whole Document.

* cited by examiner

ADVANCED THERMAL MANAGEMENT USING AN AVERAGE POWER CONTROLLER OVER AN ADJUSTABLE TIME WINDOW

BACKGROUND

1. Technical Field

One or more embodiments of the present invention generally relate to thermal management. In particular, certain embodiments relate to limiting the average power of devices in a computing system based on thermal influences.

2. Discussion

As the components of modern day computing systems continue to grow in functionality and complexity, computer designers and manufacturers are often faced with challenges associated with corresponding increases in power and energy consumption. For example, increased power consumption in a microprocessor tends to lead to a corresponding increase in temperature, which can negatively affect the performance of the processor itself as well as the performance of nearby devices. Thus, each device in a computing system may be viewed as a source of heat with regard to other "target" devices in the system.

Some models for thermal control rely on limiting the performance of the thermal source in an effort to constrain the source device's power consumption, which in turn may constrain the source device's thermal influence on the target device. Such an approach may not be an optimal solution, however, as the source device's power consumption (and therefore thermal output) at a given performance level can be highly dependent upon the workload applied to the source device. Because workloads can often be inconsistent over time given the complex interactions and varied usage models for typical systems, selecting a specific performance level may not result in the exact thermal response desired. Indeed, even if the desired thermal response is achieved occasionally, variability in the system workload may continue to undermine the thermal stability of the relationships in the system.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

In the following description, for purposes of explanation, numerous specific details are set forth in order to provide a thorough understanding of the embodiments of the present invention. It will be evident, however, to one skilled in the art that the embodiments of the present invention may be practiced without these specific details. In other instances, specific apparatus structures and methods have not been described so as not to obscure the embodiments of the present invention. The following description and drawings are illustrative of the embodiments of the invention and are not to be construed as limiting the embodiments of the invention.

Figure 1:
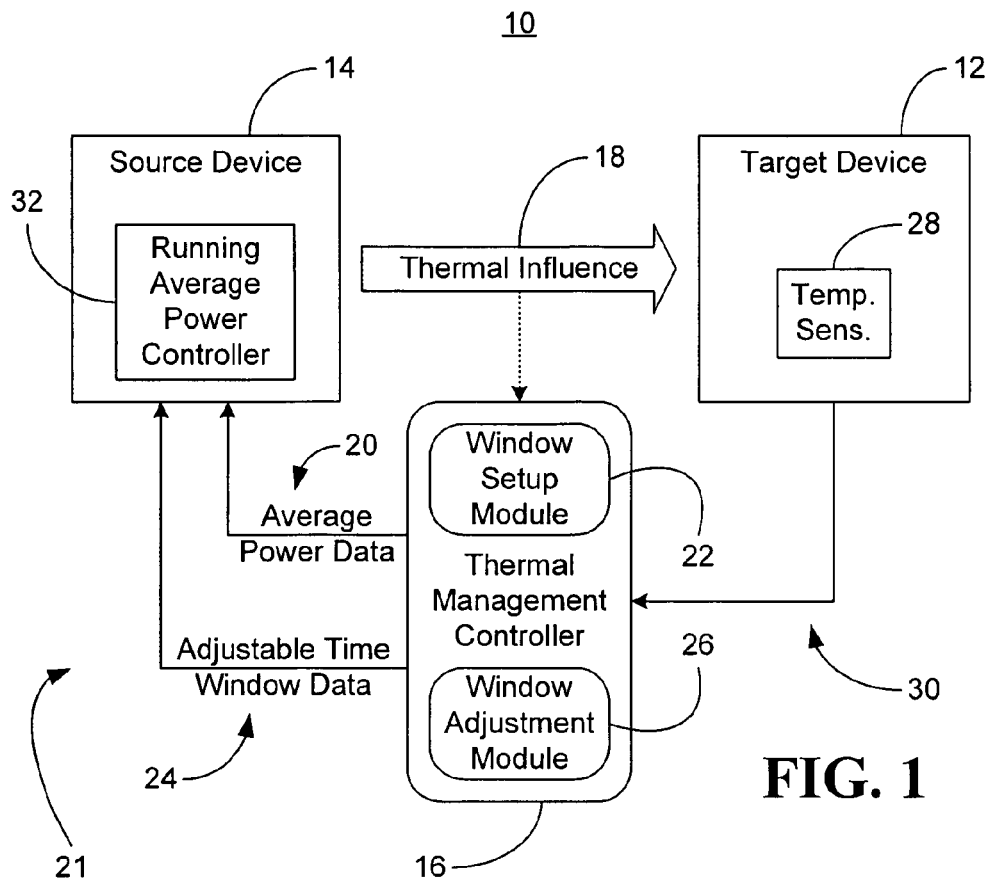
FIG. 1 is a block diagram of an example of an apparatus having a thermal management controller according to one embodiment of the invention.

FIG. 1 shows an apparatus 10 having a target device 12, a source device 14 and a thermal management controller 16. The target device 12 and source device 14 may be computing system components such as a microprocessor, an individual core of a multi-core microprocessor, a memory controller hub (MCH), an input/output controller hub (IOH), a memory device, a network interface, or any other type of power domain within a computing system. The term "power domain" is used herein to refer to any component or set of components capable of being monitored and controlled for power consumption. In the illustrated example, the target device 12 includes a temperature sensor 28. The thermal management controller 16 could be a third party element or included in the source device 14, and can be implemented in fixed functionality hardware, microcode, firmware, software, or any combination thereof. For example, a particular hardware implementation might involve the use of complementary metal oxide semiconductor (CMOS) technology, which is well established in the semiconductor industry. In the illustrated example, the thermal management controller 16 is implemented in hardware and therefore benefits from a relatively fast response time and low overhead.

The source device 14 has a thermal influence 18 on the target device 12, such that a temperature change in the source device 14 can cause a temperature change in the target device 12. The nature and extent of the temperature change associated with the thermal influence 18 can be characterized and/or quantified in a number of different ways. For example, the thermal influence 18 could be reflected in a thermal influence factor, or "theta", which may quantify the temperature of the target device 12 for a given power level of the source device 14. Theta may therefore be measured in ° C./W.

In addition, the extent to which the thermal influence is dampened may be provided by a thermal time constant, which effectively defines the amount of time required for the temperature change to be realized at the target device 12. For example, if the source device 14 and the target device 12 are located relatively far from one another, the thermal time constant might be rather high. Thermal time constants may also be a function of parameters such as airflow direction (e.g., fan considerations) and the extent to which the cooling system is shared (e.g., heat pipes and spreader considerations). A high thermal time constant could suggest that the source device 14 has a relatively weak thermal influence 18 on the target device, and a low thermal time constant could indicate a relatively strong thermal influence 18. The dampening effect on the thermal influence 18 could also be measured by a thermal mass characteristic, which relates to the overall heat storage capacity of a relationship between devices. Thus, if the relationship between the source device 14 and the target device 12 has a high thermal mass, the thermal influence would typically be weaker than that of a similarly situated relationship with a low thermal mass.

In the illustrated example, the thermal management controller 16 transmits average power data 20 to the source device 14 based on the thermal influence 18, the temperature of the target device 12, the thermal policy of the apparatus 10, and so on. In one embodiment, the average power data 20 may be a simple wattage value (e.g., measured in mW). The average power data 20 could either be transmitted directly to the source device 14 or stored in an intermediate location such as a register or memory location, where the source device 14 is able to retrieve the average power data 20 as needed. In such a case, the register/memory location may be accessible by the source device 14 and/or appropriate software running on the apparatus 10. The average power data 20 can be used by the source device 14 to control its own performance. For example, the source device 14 may determine its average power consumption, compare the average power consumption to the average power data 20 and select a performance level accordingly. Performance levels may be defined and selected in a number of different ways. One approach is to select a performance state, or Px state, as defined in the Advanced Configuration and Power Interface Specification (ACPI Specification, Rev. 3.0, Sep. 2, 2004), where a device in the P0 state uses maximum performance capability and may consume maximum power, a device in the P1 state has a performance capability that is limited below its maximum and consumes less than maximum power, and so on.

By transmitting the average power data 20 rather than a performance level or state to the source device 14, the apparatus 10 provides the source device 14 with more control over its own performance. In particular, so long as the average of the power consumption in the source device 14 is at or below the level defined by the average power data 20, the source device 14 is free to select a performance level as appropriate. For example, this freedom may include the selection of performance levels higher than would be permissible under conventional approaches. Indeed, if the workload of the source device 14 is relatively light, the source device 14 may enter the P0 state without exceeding the threshold defined by the average power data 20. As a result, the illustrated apparatus 10 enables greater flexibility in the transient power/performance of the source device 14, enables a more stable thermal response at the target device and provides greater overall performance as the apparatus 10 can reliably maintain a maximum operating temperature (and thus maximum operating performance) for any given thermal envelope.

The illustrated thermal management controller 16 also has a window setup module 22 to transmit, either directly or indirectly, adjustable time window data 24 to the source device 14, where the time window defines the amount of time for determining and controlling the average power consumption of the source device 14. The determination of average power (when active) can be done at a relatively fine granularity, where average power determinations are able to feed the predictive elements of the average power control. Thus, together, the average power data 20 and adjustable time window data 24 can represent a running average power limit (RAPL) 21, which can be used to limit the thermal output of the source device 14 by way of controlling its average power consumption over time. For example, if the time window data 24 is set at 15 ms, the source device 14 would measure and control its power consumption over a moving 15 ms period of time.

The time window data 24 may be determined based on the thermal influence 18, already discussed. Thus, the adjustable time window data 24 enables the source device 14 to take advantage of longer time constants, where the magnitude of the window can scale corresponding to the time constant. For example, if the source device 14 has a low thermal time constant with regard to the target device 12, temperature changes at the source device 14 would be realized rather quickly at the target device 12 and a small time window may be selected by the window setup module 22. A small time window could provide tighter control over the power consumption of the source device 14. While tighter control may be advantageous under certain circumstances, such control may reduce the ability of the source device 14 to tailor its own performance and could therefore result in less flexibility from the perspective of the source device 14. Alternatively, if the source device 14 has a high thermal time constant with regard to the target device, a large time window may be selected by the window setup module 22 to provide greater flexibility in the source device's run-time behavior. It should also be noted that the time window data 24 need not represent a non-zero value. In such a case, the source device 14 could determine and control its power consumption at whatever maximum rate is achievable by the hardware/software in question.

As already noted, the time window data 24 is adjustable. One approach is to adjust the time window data 24 based on the temperature of the target device 12. For example, the target device 12 may be associated with a temperature sensor 28 capable of generating a temperature signal 30, and the thermal management controller 16 may include a window adjustment module 26 operable to adjust the time window data 24 based on the temperature signal 30. In particular, the window adjustment module 26 may make use of one or more temperature thresholds to narrow/widen the time window data 24. For example, the window adjustment module 26 could narrow the time window data 24 a first time if the temperature signal 30 exceeds a first temperature threshold and narrow the time window data 24 a second time if the temperature exceeds a second temperature threshold, where the second temperature threshold is greater than the first temperature threshold. The temperature threshold values and/or time window widths may be selected based on additional factors such as quality of service and other performance vectors.

The illustrated source device 14 includes a running average power controller (RAPC) 32 to receive the average power data 20 and the adjustable time window data 24. The power controller 32, which may exist within the source device 14 or as a third party element, can include software and/or circuitry to ensure that the source device 14 meets the constraints of any active RAPLs. In this regard, it should be noted that the source device 14 may have a thermal influence over multiple target devices, where each target device could be associated with an individual RAPL. Because multiple RAPLs with differing average power and/or time window elements may be active at any given time, the power controller is able to handle (e.g., coalesce) simultaneous limits. The illustrated power controller 32 can measure the area below and above the specified average power level for the given time window, and can equalize these areas by increasing/decreasing performance with very fine-grin control. As a result, the power controller 32 is able to react quickly to (the source device's response to) workload transients.

Although the power controller 32 could continuously monitor its power consumption in accordance with the time window data 24 and compare the monitored power consumption to the threshold defined by the average power data 20, it may be desirable to reduce the processing load placed on the source device 14 by such activity. The power controller 32 may therefore alternatively take a periodic power consumption measurement at a rate much less than the rate required by the adjustable time window data 24, where the "managed rate" can primarily depend on the transitional cost (e.g., latency and power overhead) of any change in performance state on the source device 14. There may be an inherent tradeoff here on how fast the average power controller 32 can switch the source device's performance without incurring overhead that defeats any benefit. In one embodiment, it would be possible to make hundreds of fine-grain performance changes within each time window—allowing a very dynamic response from the source device 14 to address transients in the workload as well as transients in the source device's response to the workload.

Figure 2:
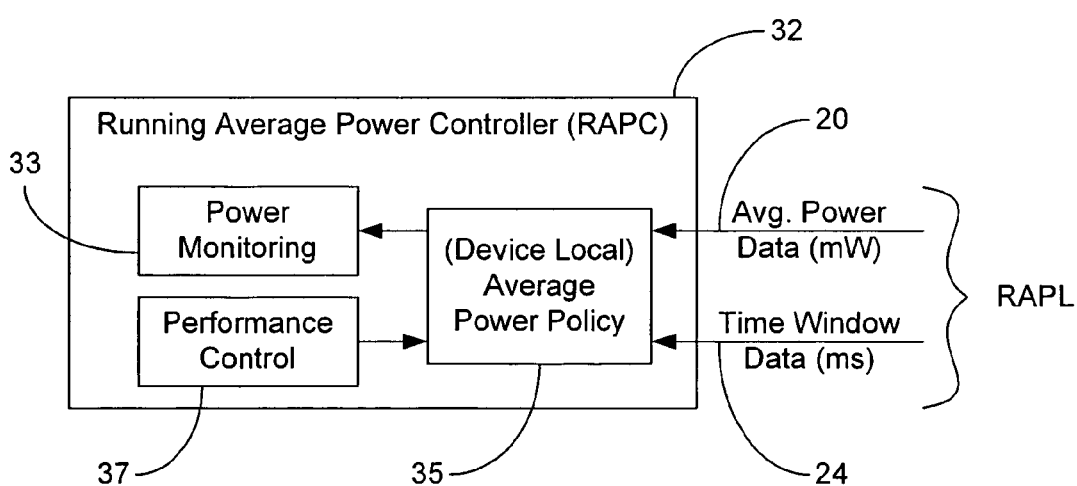
FIG. 2 is a block diagram of an example of an running average power controller according to one embodiment of the invention.

FIG. 2 illustrates that the power controller 32 can therefore use a power monitoring module 33 to compare the power consumption measurement to a power monitoring threshold. If the power monitoring threshold is exceeded, the power controller 32 may then engage a power policy 35 by monitoring the average power consumption of the source device 14 more frequently in accordance with the time window data 24. A performance controller 37 can then be used to select a performance level for the source device 14 based on the average power consumption and the average power data 20.

Returning now to FIG. 1, it should be noted that the source device 14 and target device 12 may represent only a subset of a number of devices in a system, and that more complex relationships and thermal influences may exist. For example, the target device 12 may be influenced thermally by an array of devices, all to different extents. Similarly, the source device 14 may have a thermal influence on multiple target devices, as already noted. Thus, the power controller 32 may receive a plurality of RAPLs, where each RAPL corresponds to a target device on which the source device 14 has a thermal influence. In such a case, the source device 14 may select a performance level that satisfies the most stringent of RAPLs. Furthermore, the thermal management controller 16 may be implemented on a per-device basis, centralized in a platform-level thermal management controller, or structured as some hybrid combination. Such a model could also be used to control self-thermal relationships (e.g., protecting against CPU overheating itself).

Figure 3A:
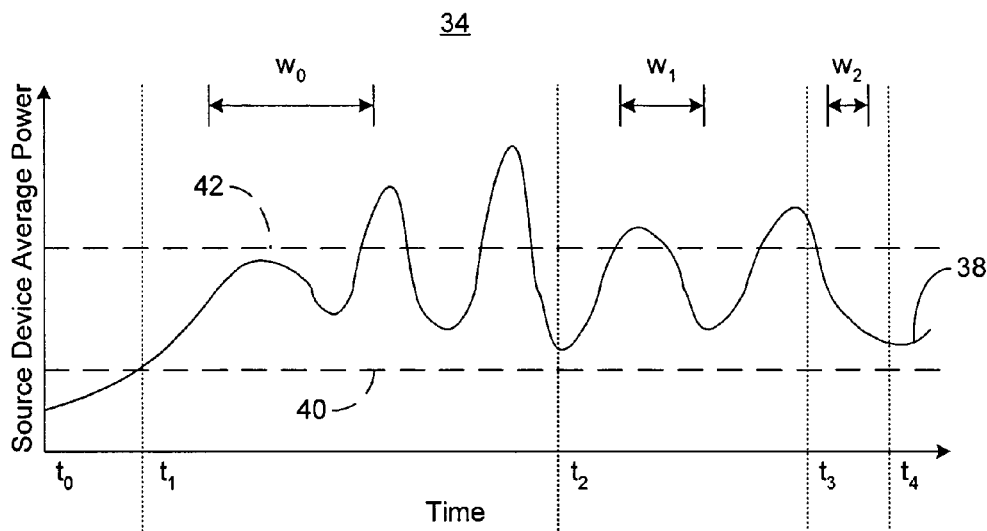
FIG. 3A is a plot of an example of a source device average power curve according to one embodiment of the invention.
Figure 3B:
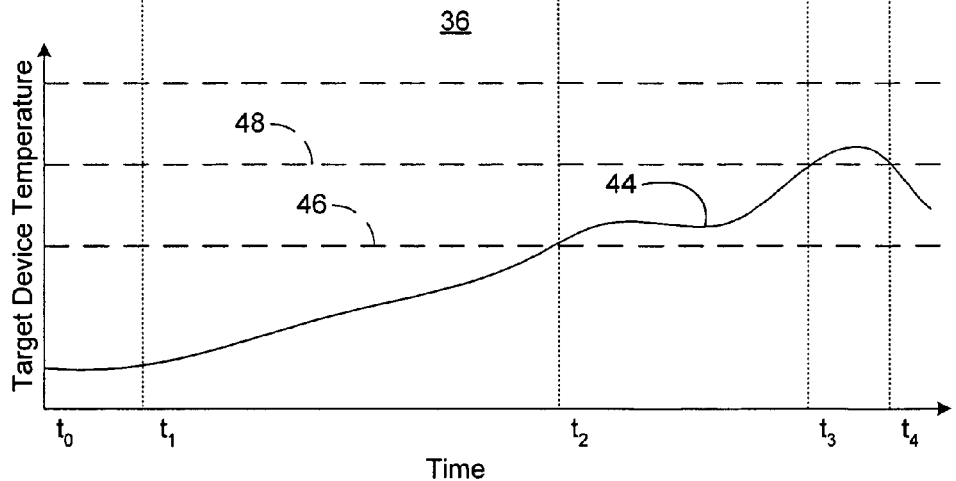
FIG. 3B is a plot of an example of a target device temperature curve according to one embodiment of the invention.

FIGS. 3A and 3B illustrate some of the above-described techniques in plots 34 and 36, respectively. In particular, plot 34 shows an example of a source device average power curve 38, a power monitoring threshold 40 and an average power threshold 42. In the illustrated example, the average power curve 38 crosses the power monitoring threshold 40 at time $t_1$, and the power controller begins monitoring the average power in accordance with a moving time window having a width $w_0$. The plot 36 demonstrates an example of a target device temperature curve 44, which crosses a first temperature threshold 46 at time $t_2$. In response to the temperature curve 44 crossing the first temperature threshold 46, the window adjustment module is able to narrow the moving time window to a width of $w_1$. Such a narrowing can provide greater resolution and tighter control over the average power consumption of the source device, and helps to reduce the risk of overheating in the target device.

At time $t_3$, the illustrated temperature curve 44 crosses a second temperature threshold 48 and the window adjustment module further narrows the moving time window to a width of $w_2$. Thus, the resolution and control over the average power consumption can be increased even further. The number of temperature thresholds and window widths can be greater or fewer than the number shown. There may also be multiple target devices with multiple average power limits being active at the same time. For example, each limit could have different average power and time constants, where the selected limit could be a blend of the individual limits. Furthermore, it will be appreciated that as the temperature falls below the various temperature thresholds, the moving time window can be widened as appropriate.

Figure 4:
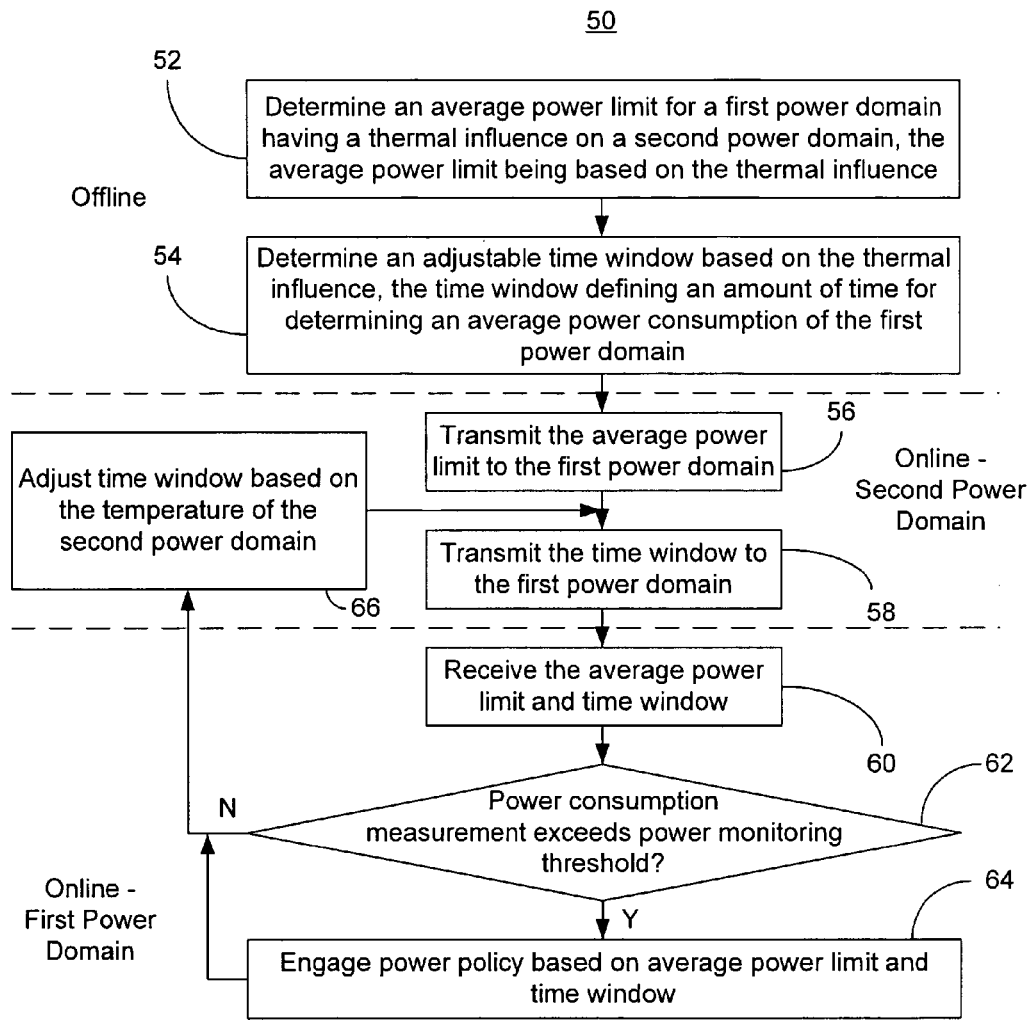
FIG. 4 is a flowchart of an example of a method of thermal management according to one embodiment of the invention.

Turning now to FIG. 4, a method of thermal management is shown. The method 50 may be implemented in fixed functionality hardware, microcode, firmware, software, or any combination thereof. For example, a particular firmware implementation might involve the storage of a set of instructions to a programmable read only memory (PROM), where if executed the instructions are operable to perform one or more portions of the method 50. In the illustrated example, an offline determination is made as to average power data and adjustable time window data at processing blocks 52 and 54, respectively. This determination might be made by the window setup module, discussed above. In particular, block 52 provides for determining average power data for a first power domain having a thermal influence on a second power domain. As already discussed, the first and second power domains may be computing system components such as a microprocessor, an individual core of a multi-core microprocessor, a memory controller hub (MCH), an input/output controller hub (IOH), a memory device, a network interface, or any other type of power domain within a computing system. Block 54 provides for determining adjustable time window data based on the thermal influence, where the time window data defines an amount of time for determining and controlling an average power consumption of the first power domain.

In the illustrated example, the average power data is transmitted to the first power domain at block 56. It can be seen that such a transmission can be made online (i.e., during real-time operation of the system) as directed by the second power domain. Thus, the second power domain (i.e., target device) can initiate transmission of the average power data to the first power domain (i.e. source device) either directly or by storing the value to a register/memory location for retrieval by the first power domain. Block 58 provides for transmitting the adjustable time window to the first power domain. The average power data and the time window are received by the first power domain at block 60. Block 62 provides for determining whether a periodic power consumption measurement for the first power domain exceeds a power monitoring threshold. As already noted, such a determination can reduce the processing load placed on the first power domain and/or power controller. If the power monitoring threshold is exceeded, a power policy may be engaged at block 64 based on the average power data and the time window. In one approach, the power policy is engaged by monitoring the average power consumption of the first power domain in accordance with the time window and selecting a performance level for the first power domain based on the average power consumption and the average power data. The performance level may also be a function of additional factors such as workload, user preferences, etc.

Block 66 provides for adjusting the time window based on the temperature of the second power domain, where the adjusted time window is re-transmitted to the first power domain at block 58. It should be noted that if no temperature change has taken place since the time window was last transmitted, the processes at blocks 66, 58 and 60 may be skipped on a given pass.

With regard to selection of the adjustable time window at block 54, the width of the time window can be based on a number of factors such as thermal time constant, thermal mass and influence factor in addition to the target device temperature already discussed.

Figure 5:
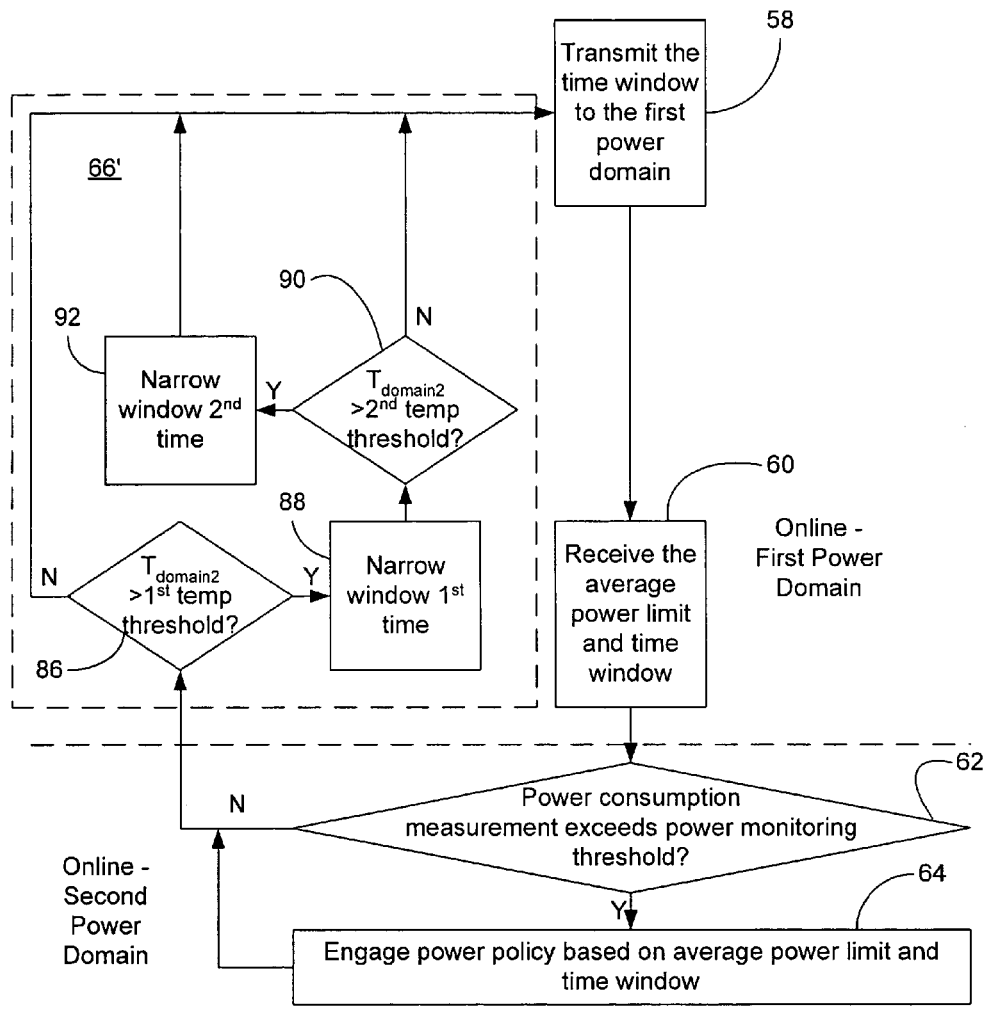
FIG. 5 is a flowchart of an example of a process of adjusting a time window according to one embodiment of the invention.

Turning now to FIG. 5, one approach to adjusting time windows is shown in greater detail at block 66'. In particular, block 86 provides for determining whether a temperature of the second power domain $T_{domain2}$ exceeds a first temperature threshold. If so, the time window is narrowed a first time at block 88. Otherwise, the process returns to block 58, already discussed. Block 90 provides for determining whether $T_{domain2}$ exceeds a second temperature threshold, where the second temperature threshold is greater than the first temperature threshold. If so, the time window is narrowed a second time at block 92. A similar process can be followed to widen the time windows in response to $T_{domain2}$ falling below the temperature thresholds.

Figure 6:
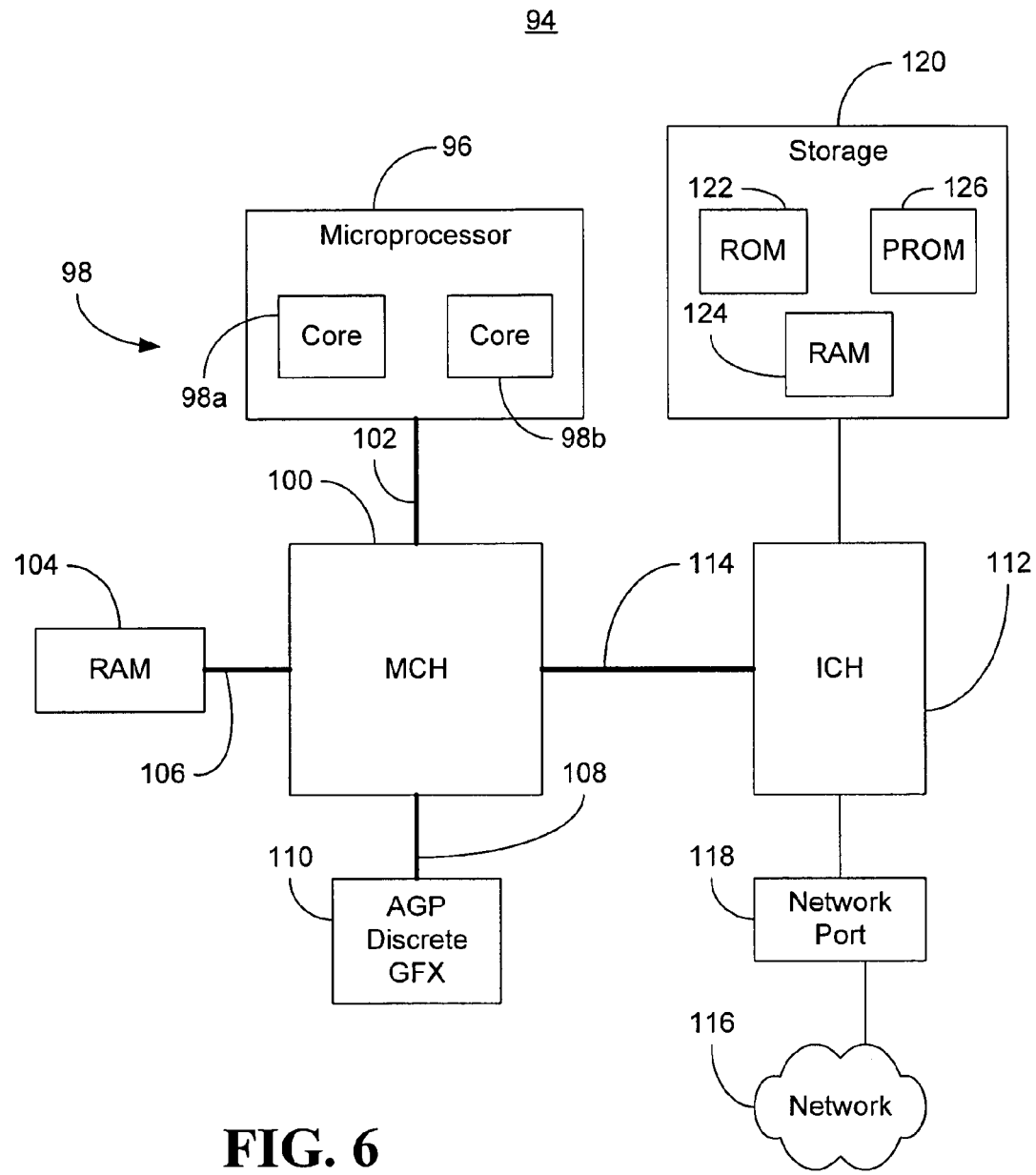
FIG. 6 is a block diagram of an example of a system according to one embodiment of the invention.

FIG. 6 shows an example of a system 94 having a microprocessor 96 with a plurality of processor cores 98 (98a-98b), where each core may be fully functional with instruction fetch units, instruction decoders, level one (L1) cache, execution units, and so on. The illustrated microprocessor 96 communicates with a memory controller hub (MCH) 100, also known as a Northbridge, via a front side bus 102. The MCH 100 can communicate with system random access memory (RAM) 104 via a memory bus 106. The MCH 100 may also communicate via a graphics bus 108 with an advanced graphics port (AGP) 110 to interface with an external video display unit (not shown). The illustrated MCH 100 communicates with an I/O controller hub (ICH) 112, also known as a Southbridge, via a peripheral component interconnect (PCI) bus 114. The microprocessor 96 may also be operatively connected to a network 116 via a network port 118 through the ICH 112.

The ICH may also be coupled to storage 120, which may include a read only memory (ROM) 122, RAM 124, programmable ROM (PROM) 126, flash memory, etc. In one embodiment, the PROM 126 includes a stored set of instructions which if executed are operable to conduct thermal management as described above, where each of the microprocessor 96, individual cores 98, MCH 100, ICH 112, RAM 104, network port 118, etc., represent power domains and/or devices that can thermally influence one another. Thus, RAPLs can be used to manage both inter-device (e.g., microprocessor to MCH) and intra-device (e.g., microprocessor to microprocessor) thermal relationships throughout the system 94.

Those skilled in the art can appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A method comprising:
   transmitting average power data to a source device, the source device having a thermal influence on a target device and the average power data being based on the thermal influence;
   transmitting adjustable time window data to the source device, the time window data defining an amount of time for determining and controlling an average power consumption of the source device; and
   determining the average power data and the adjustable time window based on a characteristic of the source device with respect to the target device, the characteristic being selected from a group comprising a thermal time constant, a thermal mass and an influence factor.

2. The method of claim 1, further including:
   narrowing the time window a first time if a temperature of the target device exceeds a first temperature threshold; and
   narrowing the time window a second time if the temperature exceeds a second temperature threshold, the second temperature threshold being greater than the first temperature threshold.

3. The method of claim 1, further including:
   receiving the average power data and the time window; and
   engaging a power policy based on the average power data and the time window if a power consumption measurement for the source device exceeds a power monitoring threshold.

4. The method of claim 3, wherein engaging the power policy includes:
   monitoring an average power consumption of the source device in accordance with the time window; and
   selecting a performance level for the source device based on the average power consumption and the average power data.

5. The method of claim 1, wherein transmitting the average power data and the adjustable time window includes storing the average power data and the adjustable time window to a memory location that is accessible by the source device.

6. An apparatus comprising:
   a target device:
   a source device, the source device to have a thermal influence on the target device; and
   a thermal management controller to transmit average power data to the source device based on the thermal influence, wherein the thermal management controller includes a window setup module to transmit adjustable time window data to the source device, the time window to define an amount of time for determining and controlling an average power consumption of the source device, wherein the window setup module is to determine the average power data and the adjustable time window based on a characteristic of the source device with respect to the target device, the characteristic being selected from a group comprising a thermal time constant, a thermal mass and an influence factor.

7. The apparatus of claim 6, wherein the thermal management controller further includes a window adjustment module to narrow the time window a first time if a temperature of the target device exceeds a first temperature threshold and narrow the time window a second time if the temperature exceeds a second temperature threshold, the second temperature threshold being greater than the first temperature threshold.

8. The apparatus of claim 6, wherein the source device includes a power controller to receive the average power data and the time window, and engage a power policy based on the average power data and the time window if a power consumption measurement for the source device exceeds a power monitoring threshold.

9. The apparatus of claim 8, wherein the power controller is to engage the power policy by monitoring an average power consumption of the source device in accordance with the time window, and selecting a performance level of the source device based on the average power consumption and the average power data.

10. apparatus of claim 8, where in the power controller is to receive plurality of average power limits and a plurality of time windows, each average power limit and time window to correspond to a target device on which the source device has a thermal influence.

11. The apparatus of claim 6, wherein the source device and the target device are computing system components selected from a group comprising a microprocessor, an individual core of a multi-core microprocessor, a memory controller hub, an input/output controller hub, a memory device and a network interface.

12. A system comprising:
   a target device:
   a source device, the source device to have a thermal influence on the target device; and
   a programmable read only memory (PROM) including instructions which if executed are operable to transmit average power data to the source device based on the thermal influence, wherein the instructions are further operable to
      transmit adjustable time window data to the source device, the time window to define an amount of time for determining and controlling an average power consumption of the source device,
      narrow the time window a first time if a temperature of the target device exceeds a first temperature threshold,
      narrow the time window a second time if the temperature exceeds a second temperature threshold, the second temperature threshold being greater than the first temperature threshold, and
      determine the adjustable time window based on a characteristic of the source device with respect to the target device, the characteristic to be selected from a group comprising a thermal time constant, a thermal mass and an influence factor.

13. The system of claim 12, wherein the source device includes a power controller to receive the average power data and the time window, and engage a power policy based on the average power data and the time window if a power consumption measurement for the source device exceeds a power monitoring threshold.

14. The system of claim 13, wherein the power controller is to engage the power policy by monitoring an average power consumption of the source device in accordance with the time window, and selecting a performance level of the source device based on the average power consumption and the average power data.

* * * * *

UNITED STATES PATENT AND TRADEMARK OFFICE
CERTIFICATE OF CORRECTION

| | | |
|---|---|---|
| PATENT NO. | : 7,549,177 B2 | Page 1 of 1 |
| APPLICATION NO. | : 11/091096 | |
| DATED | : June 16, 2009 | |
| INVENTOR(S) | : Diefenbaugh et al. | |

It is certified that error appears in the above-identified patent and that said Letters Patent is hereby corrected as shown below:

In column 8, at line 60 after, -- 10. -- insert -- The --.

Signed and Sealed this

Fifth Day of October, 2010

David J. Kappos
*Director of the United States Patent and Trademark Office*